United States Patent [19]

Nitadori et al.

[11] Patent Number: 4,696,748

[45] Date of Patent: Sep. 29, 1987

[54] PLASMA SEPARATOR AND A PROCESS FOR PREPARING THE SAME

[75] Inventors: Yoshiaki Nitadori, Oita; Toru Nakano, Nobeoka, both of Japan

[73] Assignee: Asahi Medical Co., Ltd., Tokyo, Japan

[21] Appl. No.: 788,125

[22] Filed: Oct. 16, 1985

[30] Foreign Application Priority Data

Oct. 16, 1984 [JP] Japan ................ 59-215201
Oct. 16, 1984 [JP] Japan ................ 59-215202
Nov. 1, 1984 [JP] Japan ................ 59-229001

[51] Int. Cl.$^4$ ............................................ B01D 13/00
[52] U.S. Cl. ................................ 210/636; 210/433.2; 210/500.23
[58] Field of Search ............... 210/500.23, 433.2, 651, 210/636

[56] References Cited

U.S. PATENT DOCUMENTS 4,401,567 8/1983 Shindo et al. ............ 210/500.23 X

OTHER PUBLICATIONS

WO84/03229, Boggs et al., published 8-30-84.

Primary Examiner—Frank Spear
Attorney, Agent, or Firm—Birch, Stewart, Kolasch & Birch

[57] ABSTRACT

A plasma separator containing porous hollow fibers composed of a polyolefin having elliptic pores defined by microfibrils and knotted portions, in which the pores of the hollow fibers, together with the spaces between the inner surface of the vessel and the fibers and between and inside the fibers, are filled with a sterile water or sterile solution and which has been sterilized with a sterilizing gas before the filling operation of the sterile water or solution. Incorporation of the water or solution into the pores is attained by applying a pressure to the water or solution. The incorporation of the water or solution causes the limiting pore diameter of the pores of the precursor hollow fibers to expand, thereby changing the pore characteristics of the precursor hollow fibers. The plasma separator, exhibiting high plasma component permeabilities, can be used safely, without troubles of hemolysis and residual chemical or solvents, and readily, without troubles of priming and washing. Therefore, the plasma separator is useful for therapy and plasma collection.

9 Claims, 5 Drawing Figures

Stretching Direction

PLASMA SEPARATOR AND A PROCESS FOR PREPARING THE SAME

This invention relates to a plasma separator and a process for preparing the same. More particularly, the present invention is concerned with a plasma separator containing porous hollow fibers composed of a polyolefin which have elliptic pores defined by microfibrils and knotted portions. The separator, after sterilization with a gas, is filled with a sterile water or sterile solution. The present invention is also concerned with a process for preparing such a separator, in which the above-mentioned hollow fibers obtained by spinning a polyolefin, followed by cold stretching and hot stretching, are incorporated in a vessel and, after sterilization, a sterile water or solution is charged, followed by application of pressure. The separator is useful to separate plasma from whole blood for medical purposes.

In recent years, porous membranes made of a macromolecular compound are increasingly used in the field of medical treatment. Especially, actual use is being made of techniques for dividing blood into various blood components according to a membrane separating method. Among such techniques, the technique using a plasma separator capable of dividing blood into corpuscle components and plasma components has come to be utilized for a variety of medical treatment purposes. An example of such medical treatment is found in a plasma exchange therapy in which the plasma of a patient suffering from a disease caused by an abnormal plasma component is separated and discarded, followed by replacement with fresh plasma from a healthy person. Another example of such medical treatment is found in a plasma purification therapy in which the plasma is separated and purified and then returned to a patient. Further, examples of such medical treatment are found in a plasma collection in which only the plasma is collected from a healthy person, and a plasma separation from a stored blood in which the stored blood is divided into blood corpuscle components and plasma components.

For wide use, it is required that the plasma separator have a high separation efficiency and permit treatment within a shortened period of time. The separator also must ensure facile operation, must be low-priced and must be safe from a medical point of view.

In the efforts for meeting the above requirements, there have been proposed various plasma separators comprising new porous membranes made of a variety of materials. Of these porous membranes to be incorporated in a plasma separator, a porous membrane composed of a hydrophobic polymer is advantageous as a plasma separating membrane due to its low water-swelling during the treatment with an aqueous liquid such as blood, little decrease in mechanical strength in water and low possibility of blood-leakage leading to a serious accident. A porous membrane made of a hydrophobic polymer may be prepared by a customary wet membrane forming method (see, for example, U.S. Pat. No. 3,615,024) or by a customary melt phase-inversion method in which the polymer is mixed with an additive such as a plasticizer followed by melt forming and subjected to extraction of the additive for removal (see, for example, U.K. Patent No. 20 26 935). Alternatively, a porous membrane of a hydrophobic polymer may be prepared by a customary stretching perforation method as described below, which can be advantageously employed for a crystalline polymer (see, for example, U.S. Pat. No. 3,558,764).

In the stretching perforation method, a crystalline polymer is melt molded to form a hollow fiber which is subjected to cold stretching to cause cleavages among crystalline lamellae of the hollow fiber and then subjected to hot stretching to attain a pore expansion of the hollow fiber, thereby forming pores which are defined by microfibrils oriented in the stretching direction and knotted portions that are cross-connected to said microfibrils and are each in the form of stacked lamellae. The diameter of the microfibrils is in the range of from several hundred to several thousand angstroms, and the length of the microfibrils is in the range of several thousand to several ten thousand angstroms. On the other hand, the thickness of the knotted portions is about several to several ten times the diameter of the microfibrils, and the length of the knotted portions is generally very large. The pores include intermediate pores which are present within the wall of the porous hollow fiber in communicating relationship and end pores which open at the inner and outer wall surfaces of the hollow fiber. The pores form throughpaths running from the inner wall surface of the hollow fiber to the outer wall surface of the hollow fiber. The porous membrane obtained by this process is a valuable membrane ensuring a high safety in application to medical treatment, because no additives such as organic solvents or plasticizers are added during the preparation process of the porous membrane. For forming pores in the membrane, no additive extracting step is required, and the membrane is free from troubles of dissolution-out of the remaining addives at the time of using the membrane.

Of various polyolefins, a high density polyethylene is a preferred material for preparing a membrane, since it has an excellent moldability thereby to facilitate preparation of a hollow fiber and has a high crystallinity which is advantageous to obtain a porous membrane having a relatively large pore diameter. Hence, there have been proposed porous membranes in the form of a hollow fiber which are produced by the above-described stretching perforation of a high density polyethylene (see, for example, U.S. Pat. No. 4,401,567, Japanese Patent Application Laid-Open Specification Nos. 52-137026/1977, 57-42919/1982, 57-66114/1982 and 57-84702/1982).

Generally, it is expected that the plasma separator, which is an apparatus for separating plasma from the blood for therapeutic and plasma collection purposes, has the following functions and properties:

(1) the apparatus is suited to cause all of the intended plasma components to permeate through the membrane while inhibiting the permeation of blood corpuscles;
(2) it is compact and exhibits a high plasma separation efficiency;
(3) its safety is high; and
(4) its handling and operation are facile.

With respect to item (1) above, the smallest of the blood corpuscles to be inhibited from permeation through the membrane is thrombocyte having a diameter of 2 to 3 $\mu$m. Therefore, the porous membrane should have pores capable of inhibiting transmission of particles having the above-mentioned size. Intended components to be passed through the membrane may vary depending on the purpose of effecting a plasma separation. In the case of a medical treatment, the plasma of a patient suffering from a disease caused by an abnormality in plasma components is separated and replaced by a fresh plasma, or alternatively the separated plasma is subjected to clean-up to remove the cause substance and then returned to the patient. As such diseases, there may be mentioned, for example, autoimmune diseases such as rheumatoid arthritis and systemic lupus erythematosus, hyperlipemea and the like. As the substances to be removed, there may be mentioned immunoglobulin which is an autoantibody and immune complexes in the case of autoimmune diseases, and low density lipoprotein (hereinafter referred to as "LDL") in the case of hyperlipemea. Such substances to be removed generally have a high molecular weight and are large in molecular size. For example, IgM which is a kind of immunoglobulin has a molecular weight of 900,000 and a size of 35 nm, and immune complexes which are not a specific substance are estimated to have a moleculer weight from 1,000,000 to several millions and a size of about 20 to 50 nm. LDL is also a macromolecule having a molecular weight of 2,200,000 to 3,500,000 and a size of 20 to 30 nm. Plasma separation for collecting plasma is intended to collect useful plasma components, in which plasma may be collected from volunteers by means of direct extracorporeal circulation or alternatively plasma may be collected from a stored blood. In any cases, a useful intended plasma protein should be permeated as a plasma component. Fraction preparations obtained from plasma include one having a relatively low molecular weight such as albumin having a molecular weight of 60,000 and a molecule size of 4×15 nm, one having a high molecular weight such as immunoglobulin as mentioned above and fibrinogen having a molecular weight of 340,000 and a molecular size of 3×70 nm, and also one having a molecular weight of 1,000,000 to 2,000,000 such as Coagulation Factor VIII used for treatment of hemophilia. As mentioned above, the plasma components to be passed through the membrane have often a molecular size up to several ten nanometers in both of the purposes of medical treatment and plasma collection.

With respect to item (2) above, in many cases, plasma separation is effected by introducing blood into a plasma separator from bodies of patients or volunteers by means of direct extracorporeal circulation. To minimize the burden upon the patients or volunteers as much as possible, it is desirable that blood separation can be completed within a short period of time, and that the amount of blood to be extracorporeally circulated is as little as possible. A membrane in the form of a hollow fiber is advantageous over a plane membrane in that a separation device can be made compact, thereby leading to a reduced extracorporeal circulation volume. Hence, if a membrane having an improved filtration rate is developed using hollow fibers, the membrane gets an extremely great significance, because there can be attained not only a device of small size but also reduction in time required for plasma separation.

With respect to item (3) above, safety is a very important matter since the plasma separator is employed for medical treatment. Accordingly, the membrane to be incorporated in the plasma separator must have a sufficient strength and must be free from leakage problems. The membrane must not contain any elutable matters, and must be highly compatible with the blood. The membrane must not have any unfavorable influence on the blood, and especially must not cause hemolysis problems. With respect to the above-mentioned hemolysis, it is recognized that hemolysis has a close relation with the pore size of a porous membrane. It is also recognized that erythrocytes tend to be incorporated in the pores if the pore size is expanded to increase the molecule size to be fractioned by the membrane, and that hemolysis is apt to occur at a pore size of 0.7 $\mu$m or more.

Currently known porous hollow fiber membranes of a polyolefin, which are prepared in accordance with the stretching perforation method as described hereinbefore, have the following advantages. The membranes do not contain any elutable matters because no additives, organic solvent and the like are used during the process of preparation. The membranes can have a high mechanical strength in an aqueous medium, since they are of hydrophobic nature. The membranes are inert to living bodies and have no unfavorable influences on blood. The membranes are advantageous from the viewpoint of prevention of hemolysis. This is because the open pores on the membrane surface to be contacted with blood have an elliptic shape which is more advantageous in preventing hemolysis than the pores having a cylindrical shape when the former pores have about the same size as that of the latter pores.

However, the porous hollow fiber membranes of polyolefins known in the art are insufficient for actual use as a membrane to be incorporated in a plasma separator from the viewpoints of fractioned molecule size and filtration rate. For example, a membrane as disclosed in Example 4 of Japanese Patent Application Laid-Open Specification No. 57-84702/1982, which is the most excellent of the membranes disclosed in the examples of the specification, exhibits a filtration rate of 4.6 l/m$^2$.hr.mmHg for pure water, a permeability of 98% for human serum albumin and a permeabiliry of 90% for total proteins. Although no data is shown in the specification on the permeability for macromolecular proteins, the low value of total protein permeability suggests that the size of fractioned molecules is small. The filtration rate also remains at a low level. On the other hand, a membrane as disclosed in Example 1 of Japanese Patent Application Laid-Open Specification No. 57-66114/1982 exhibits a water permeability as small as 3,200 l/m$^2$. hr.760 mmHg (4.2 l/m$^2$.hr.mmHg) and a permeation rate as low as 50% for Blue Dextran 2000 having a molecular weight of about 2,000,000 (a product of Pharmacia Fine Chemicals, Sweden which is produced by bonding a dye to dextran), despite that the membrane has an average pore diameter as large as 0.82 $\mu$m as measured with a mercury porosimeter.

As mentioned hereinbefore, the porous hollow fiber membranes prepared in accordance with the stretching perforation method have always a structure as described below as an inevitable consequence of the preparation method. The obtained membrane is composed of basic units having an elliptic shape formed by microfibrils oriented in the stretching direction of the membrane and knotted portions that are cross-connected to the microfibrils. Over the surfaces of the membrane, the basic units are arranged in plane thereby to form end pores which open at the inner and outer wall surfaces of the membrane. In the wall structure of the membrane, the basic units lie in communicating relationship thereby to form intermediate pores, and the intermediate pores cooperate with the end pores to form throughpaths running from the inner wall surface of the membrane to the outer wall surface of the membrane. The distance between microfibrils in the basic units at the surface area of the membrane is to be basically the same as that at the inside, since the perforation is carried out by dynamic means i.e. stretching. However, the basic units within the wall structure of the membrane contain pores having a smaller pore size than that of the pores on the surface due to the stacking of the basic units. On the other hand, the stretching is effected only uniaxially. Hence, it is difficult to increase the pore diameter by increasing the stretching rate. Even if the pore diameter could be increased, thereby increasing the diameter of pores for permeation, it would be inevitably accompanied by expansion of the end pores, which leads to troubles of hemolysis occurrence, thereby making the membrane unsuitable for plasma separation.

For the measurement of pore diameters of porous membranes, a method using a mercury porosimeter is well known. However, this method has problems as described below, and is never suited for the characterization of pores of porous membranes to be used for plasma separation. That is, in the method of mercury porosimetry, the pore diameters are calculated from the pressure applied to introduce mercury into the pores. The pressure is as high as several hundred to one thousand kg/cm². As a result, the generally called ink-bottle pores through which water or the like cannot permeate are also measured as the pores. Moreover, according to the method of mercury porosimetry, the limiting pore diameter, which is the smallest of the diameters of throughpath pores and controls the size of fractioned molecules, cannot be distinguished from the non-limiting pore diameter, which is larger than the limiting pore diameter and does not control the size of fractioned molecules. Further, the measured diameters may be different from the actual diameters, since mercury is introduced into the pores at a high pressure of up to 1,000 kg/cm², thereby causing the pores of porous membranes having an insufficient strength to break. Selective passing of materials is the essential function of the porous membranes, and therefore the diameter measuring method based on permeability is a suitable method for determination of pore diameters. As such a suitable diameter-measuring method, there may be mentioned a method in which the measurement is effected on the basis of permeability of standard particles having a known particle diameter, and a wet membrane gas permeation method according to ASTM-F316-70. The former method of utilizing standard particles may be an excellent method, since the measurement is effected under conditions that are similar to the actual conditions of use. However, this method has a drawback that one measurement gives the permeability for only one particle diameter, and therefore numerous measurements should be effected using a number of standard particles having varied particle diameters to find out a particle size distribution. This method has another drawback that measurement cannot be made for pore sizes exceeding a certain particle size level, because the available standard particles are limited in particle diameter. Moreover, this method cannot be used to evaluate the number of pores although the pore sizes can be evaluated due to the determination of permeability.

The wet membrane gas permeation method according to ASTM-F316-70 is a method in which the pore diameters are determined utilizing a relationship between the pore diameter and the pressure which is necessary for breaking of the liquid film formed as a result of filling the pores with a liquid. The above-mentioned relationship is by the formula:

$$P = -\frac{4\gamma \cos\theta}{D}$$

wherein P represents the gas pressure applied to the liquid film; D represents the pore diameter; $\gamma$ represents the surface tension of the liquid; and $\theta$ represents the contact angle ($\theta = 0$ in this case).

In this method, only pores which contribute to permeation are evaluated, and a pore diameter distribution can be measured by varying the gas pressure. This method is also useful to obtain information on the number of pores since the gas flow rate is a function of pore diameter and pore quantity.

An appropriate evaluation of the pore characteristics which control the permeability of porous membranes can be attained by utilizing the above-mentioned two methods in combination.

The polyethylene porous membrane as prepared in accordance with the process disclosed in Examples of Japanese Patent Application Laid-Open specification No. 57-66114/1982 was re-evaluated by the above-mentioned methods. As a result, it was found that while the average pore diameter was as large as 0.8 μm according to the mercury porosimeter measurement, the membranes exhibited a permeability of as low as 50% for Blue Dextran, a permeability of 34% for a colloidal silica having a particle diameter of 0.08 μm, a permeability of 8% for a polymer latex having an average particle diameter of 0.11 μm and a permeability of 0.5% for a polymer latex having an average particle diameter of 0.2 μm. Further, the fraction of pores having a diameter of 0.25 μm or more relative to the whole pores was 5% as measured in accordance with the wet membrane gas permeation method. These results suggest that the average pore diameter as measured with the mercury porosimeter is not a true one and has not much meaning for evaluating such a porous membrane, and the true average pore diameter is lower than that.

The porous membrane for plasma separation must have pores having a pore diameter sufficient to pass as much plasma componets as possible without causing them to suffer damaging. However, the pores should not be so large as to allow blood corpuscle components also to pass therethrough. The largest component of plasma is estimated to have a size of about 50 nm. Hence, the porous membrane for plasma separation must have pores having a diameter enough to pass such a component. The following equation was proposed by Ferry with respect to the relationship between the diameter of a material passing through a pore and the diameter of the pore [see Chem. Rev. vol 18, 373 (1936)]. It is believed that the equation is well in agreement with found values.

$$Sc = \left[2\left(1 - \frac{A}{D}\right)^2 - \left(1 - \frac{A}{D}\right)^4\right] \times 100$$

wherein Sc represents the permeability (%); A represents the diameter of a substance to be passed; and D represents the pore diameter.

From the equation, the pore diameter of a porous membrane required for passing 90% or more of particles having a particle diameter of 50 nm is calculated to be 0.25 μm or more. The pore diameter obtained according to this equation is a diameter which controls the permeation of a substance and also the smallest of the diameters of the pores. Hence, that pore diameter can be regarded as "a limiting pore diameter."

As a drawback of a porous membrane made of a hydrophobic polymer such as polyethylene, it can be mentioned that an aqueous liquid such as blood does not wet a hydrophobic polymer so that it is difficult for such a liquid to permeate into the pores of the hydrophobic porous membrane. Therefore, the plasma separator containing a hydrophobic porous membrane cannot be utilized without prior treatment. Hence, there have been proposed various methods for previously treating a hydrophobic membrane so that an aqueous liquid can permeate into the pores of the membrane. As the known methods for such treatment, there may be mentioned a method in which a hydrophobic porous membrane is treated with a surfactant; a method in which a water-miscible organic solvent having a low surface tension is permeated into the pores and then the solvent in the pores is replaced by water; and a method in which a hydrophilic group is chemically introduced into the membrane surfaces. However, in the case where the hydrophobic membrane is treated with a surfactant, a plasma separator containing the thus treated membrane has such a problem of safety that the surfactant may be eluted into the blood and plasma during the plasma separation. In the case where a water-miscible organic solvent having a low surface tension is used for the treatment, ethyl alcohol of which the toxicity is believed to be low is generally employed. However, the organic solvent such as ethyl alcohol is liable to remain in the membrane even after the washing with a large amount of water because of the strong affinity of the solvent for a hydrophobic membrane, and the remaining ethyl alcohol is reported to cause formation of thrombus [see Takamatsu et al, Kobunshi Ronbunshu vol. 36, No. 4, 231 (1979)]. Further, in the case where a hydrophilic group is chemically introduced into the membrane surfaces, there are problems that the solvent employed for effecting the chemical reaction is liable to remain unwashed in the ultimate plasma separator as in the case of using an organic solvent having a low surface tension, and that the treatment is not practical because a vast cost is to be spent.

As disclosed in PCT Application International Publication No. WO84/03229, to obviate the above-mentioned problems, there has been proposed a method in which a pressure is applied, instead of using chemical agents, to wet the pores of a porous membrane. This method is based on the principle that to incorporate a liquid not having a property of wetting a pore into the pore, it is needed to apply a pressure (P) which satisfies the formula:

$$P = -\frac{4\gamma \cos \theta}{D}$$

wherein $\gamma$ represents the surface tension of the liquid; $\theta$ represents the contact angle of the liquid; and D represents the pore diameter.

This method is advantageous as compared with the foregoing methods from the viewpoint of safety in medical treatment applications since any chemical agent is not used. However, in this method, sterilization is effected in the wet state. That is, for example, a plasma separator is subjected, in this method, to a steam sterilization under a high pressure or a $\gamma$-ray sterilization. However, the kinds of materials which can endure the sterilization in the wet state are very limited. For example, when the sterilization is conducted by a steam sterilization under a high pressure, the materials to be employed must be resistant to a temperature of 121° C. or more. Hence, the sterilization method cannot be applied to the porous membrane of polyethylene produced by the stretching perforation method described hereinbefore. On the other hand, in the case of the $\gamma$-ray sterilization method, the polymeric materials are exposed to a strong radiation, by which the materials tend to suffer serious damages. Especially, the polyvinyl chloride often employed as a blood circuitry in a plasma separator is seriously decomposed by the $\gamma$-ray radiation thereby to form a decomposition product. Therefore, the $\gamma$-ray sterilization method cannot be applied to the polyvinyl chloride.

As described above, the prior art methods have problems remaining unsolved which are serious in effecting applications for medical instruments.

Moreover, the plasma separator must be supplied in a sterile condition, as is apparent from the purpose of use for medical treatment or the like. From another viewpoint, it is desired that the plasma separator be readily utilized at the bedside or the like, and that for the device, troublesome pretreatments such as priming, washing and the like be unnecessary. However, the customary plasma separators comprising a porous membrane of a hydrophobic polymer are dried and sterilized with ethylene oxide. As a result, usually they are supplied in a dry state. Therefore, the plasma separators must be primed with a physiological saline to remove the air in the pores prior to use, and must be washed with a large amount of a physiological saline to remove any chemical agents. Even after washing with a large amount of the saline, the chemical agents cannot be removed completely, leaving behind a problem of residual solvent.

The inventors have made extensive and intensive studies with a view to solving the above-mentioned drawbacks of the conventional plasma separators. As a result, the inventors have found that a desirable plasma separator can be produced by using a specific hollow fiber, incorporating the fiber in an appropriate vessel, exposing the resulting assembly to a sterilizing gas and filling any spaces within the vessel with a sterile water or solution, followed by application of pressure. Based on this novel finding, we have completed this invention.

It is, therefore, an object of the present invention to provide a novel plasma separator which exhibits excellent permeabilities for plasma components, being free from hemolysis problems and from residual solvent or chemical agent problems, and which can be immediately used without troublesome pretreatments such as air removal and washing.

It is another object of the present invention to provide an advantageous process for preparing such a plasma separator of the kind described above.

The foregoing and other objects, features and advantages of the present invention will be apparent to those skilled in the art from the following detailed description and appended claims taken in connection with the accompanying drawings in which:

In one aspect of this invention, there is provided a plasma separator comprising:

a vessel provided with a blood introduction means, a blood withdrawal means and a plasma withdrawal means; and a plurality of porous hollow fibers which are contained within the vessel, leaving spaces between the inner surface of said vessel and said plurality of porous hollow fibers and between and inside said plurality of porous hollow fibers;

said blood introduction means and said blood withdrawal means communicating with each other through said plurality of porous hollow fibers fluidtightly connected therebetween;

said hollow fibers being adapted to pass blood therethrough while causing the plasma component of the blood to be selectively passed through the walls of the hollow fibers and withdrawn through the plasma withdrawal means;

each hollow fiber being made of a polyolefin oriented in the lengthwise direction of the hollow fiber and having elliptic pores defined by microfibrils that are oriented in the lengthwise direction of the hollow fiber and knotted portions that are cross-connected to said microfibrils and are each in the form of stacked lamellae, said pores including intermediate pores which are present within the wall of the porous hollow fiber in communicating relationship and end pores which open at the inner and outer wall surfaces of the hollow fiber and forming throughpaths running from the inner wall surface of the porous hollow fiber to the outer wall surface of the porous hollow fiber;

said spaces and said pores being filled with a sterile water or sterile solution substantially not containing any non-physiological organic compound;

and which separator has been sterilized with a sterilizing gas before said spaces and said pores are filled with the sterile water or sterile solution and is aseptically isolated from the environment after said spaces and said pores are filled with the sterile water or sterile solution.

It is preferred that the porous hollow fibers to be contained in the plasma separator of the present invention have the following characteristics:

each end pore which opens at the inner wall surface of the hollow fiber having:

an average nominal major axis ($d_l$) of from 0.3 to 3.0 μm, and an average nominal minor axis ($d_s$) of from 0.1 to 0.5 μm;

and each hollow fiber having:

a fraction of pores having a diameter of 0.25 μm or more, relative to the whole pores, of 15% or more, as measured from a pore diameter distribution curve obtained in accordance with the wet membrane gas permeation method, a water permeability of from 5 to 20 l/hr.m².mmHg, a permeability for colloidal silica, which has an average particle diameter of 0.08 μm, of 70% or more, and a permeability for polymer latex, which has an average particle diameter of 0.2 μm, of from 10% to 80%, and a limiting pore diameter ($D_L$), as measured in accordance with the standard particle permeation method, satisfying an inequality:

$$D_L/d_s \geq 0.9$$

wherein ds is as defined above.

The kind of the vessel to be employed in the present invention is not critical, and the vessel may be composed of, for example, a material selected from various plastics such as polycarbonate, a copolymer of acrylonitrile and styrene, polystyrene and a terpolymer of acrylonitrile, butadiene and styrene. The vessel, which is provided with a blood introduction means, a blood withdrawal means and a plasma withdrawal means, is well known in the art and can be fabricated according to customary procedures.

The porous hollow fibers to be contained in the plasma separator of the present invention is made of a polyolefin. It is preferred that the polyolefin be crystalline. As the suitable polyolefin, there may be mentioned, for example, polyethylene, especially a high density polyethylene, polypropylene and poly-4-methylpentene-1. Of them, a high density polyethylene is most preferred. With respect to the molecular size of the polyolefin, it usually exhibits a melt index of from 0.1 to 30 as measured according to ASTM D 1238. The specific hollow fibers to be employed in the present invention are prepared according to the stretching perforation method which has been described hereinbefore and, with respect to preparation conditions, will be explained later. The hollow fibers, as described hereinbefore, have elliptic pores defined by microfibrils that are oriented in the lengthwise direction of the hollow fiber and knotted portions that are cross-connected to said microfibrils and are each in the form of stacked lamellae. The pores include intermediate pores which are present within the wall of the hollow fiber in communicating relationship and end pores which open at the inner and outer wall surfaces of the hollow fiber, and form throughpaths running from the inner wall surface of the hollow fiber to the outer wall surface of the hollow fiber.

By this invention, a great improvement has been attained in the permeability for high molecular plasma components, which has been a target unsolved in the prior art. Moreover, the plasma separator according to this invention can be used safely without troubles of hemolysis or the like. As mentioned above, any surfactant, organic solvent or the like is not used to wet the pores of the polyolefin hollow fibers to be contained in the plasma separator of the present invention. Therefore, the plasma separator of the present invention is free from the troubles of conducting time-consuming operations for removing any residual solvents or other chemicals. The plasma separator of the present invention is sterilized with a sterilizing gas such as ethylene oxide etc. in the dry state, and any spaces and pores within the device are filled with a sterile water or sterile solution substantially not containing any non-physiological organic compound. The plasma separator is aseptically isolated from the environment. Therefore, the plasma separator of the present invention can be utilized without any prior complicated procedures but with only simple arrangements.

The plasma separator of the present invention is useful to divide the blood into blood corpuscles and plasma, and can be utilized for medical treatment such as plasma exchange therapy and plasma purification, but also for plasma collection from a healthy person and for plasma separation from a stored blood. Moreover, the plasma separator of the present invention may be useful to divide a body fluid into solid components and liquid components, for example, to remove cancer cells from a cancerous abdominal fluid as an abdominal fluid treating apparatus.

The sterile water or sterile solution to be used in the present invention may be a water or aqueous solution of physiological salts which contains neither microorganisms such as bacteria nor any medically toxic substances such as pyrogens or the like. Examples of the physiological salts are salts of $Na^+$, $K^+$, $Ca^{2+}$, $Mg^{2+}$ and the like. As the suitable sterile water or solution, there may be mentioned a sterile distilled water, a sterile physiological saline solution and sterile Ringer's solution. The sterile water or solution to be employed in the present invention does not contain substantially any non-physiological organic compound such as ethyl alcohol. The organic compound may be hazardous because even a small amount of the compound adsorbed to a hydrophobic polymer surface may cause thrombus formation of other bad effects on the blood. The expression "not containing substantially any non-physiological organic compound" as used herein means that the amount of the compound is less than a level having a biologically unfavorable influence. The above-mentioned level having a biologically unfavorable influence varies depending on the kind of the organic compound. This level can generally be estimated from the toxicity data given in the Registry of Toxic Effects of Chemical Substances, 1981-1982 edition, vol. 1-3, edited by R. L. Tatken et al and published by National Institute for Occupational Safety and Health, Cincinnati, Ohio. For example, with respect to ethanol, there is a description to the effect that the dose causing primary eye irritation is 20 ppm. Hence, with respect to ethanol, the level having a biologically unfavorable influence can be estimated at 20 ppm.

The terminology "non-physiological organic compound" as used herein means any substance selected from the group consisting of surfactants, hydrophilic group-introducing agents such as polyethylene glycol and low molecular weight liquid organic compounds generally called organic solvents.

Within the plasma separator of the present invention, the pores of the hollow fibers, together with the spaces between the inner surface of the vessel and the porous hollow fibers and between and inside the porous hollow fibers, are filled with a sterile water or sterile solution substantially not containing any non-physiological organic compound. Incorporation of the water or solution into the pores is attained by applying a pressure in the present invention. The incorporation of the water or solution causes the limiting pore diameter of the pores of the precursor hollow fibers to expand, thereby changing the pore characteristics of the precursor hollow fibers.

The porous hollow fiber to be used in the present invention preferably has an inside diameter of from 200 to 500 $\mu$m, a membrane thickness of from 20 to 100 $\mu$m and a porosity of from 30 to 80%.

The pores of the porous hollow fiber have an elliptic shape defined by microfibrils that are oriented in the lengthwise direction of the hollow fiber and knotted portions that are cross-connected to the microfibrils. The elliptic pores include intermediate pores which are present within the wall of the porous hollow fiber in communicating relationship and end pores which open at the inner and outer wall surfaces of the hollow fiber. It is required that the end pores have pore sizes necessary for all plasma components to pass therethrough and for blood corpuscles to be inhibited from passing therethrough. With respect to erythrocytes, the end pores can, besides inhibiting the passing of erythrocytes, prevent corpuscle damage, i.e. hemolysis, which is caused by falling of erythrocytes into end pores. In order to prevent such damage of erythrocytes, the end pores preferably have such a shape and size as to cause no falling of erythrocytes therein. Erythrocytes generally have a shape of elliptic disk having a major axis of about 8 $\mu$m and a thickness of about 2 $\mu$m, but the shape may be varied. Taking into consideration such a size of erythrocytes, the end pore of the porous hollow fiber to be used in the present invention preferably has an average nominal major axis of 3.0 $\mu$m or less and an average nominal minor axis of 0.5 $\mu$m or less to prevent falling of erythrocytes into the end pore. In consideration of permeation for plasma components, the end pore preferably has an average nominal major axis of 0.3 $\mu$m or more and an average nominal minor axis of 0.1 $\mu$m or more. The nominal major axis of the end pore of the porous hollow fiber is intended to mean the largest diameter of the end pore, and the nominal minor axis is intended to mean a diameter of the end pore which diameter crosses the largest diameter at a right angle while dividing the largest diameter into equal lengths. The methods of obtaining values of the average nominal major axis and the average nominal minor axis will be explained later.

Properties of the pores of the porous hollow fiber to be used in the present invention may be evaluated by means of a pore diameter distribution curve obtained by the wet membrane gas permeation method according to ASTM F316-70 and by means of the permeability for standard particles. The methods of obtaining the curve and determining the permeability will be explained later. It is generally believed that a porous membrane for a plasma separator is required to pass 90% or more of particles having a diameter of 50 nm. For attaining such a permeation of 90%, the pore diameter is calculated to be 0.25 $\mu$m from Ferry's equation as mentioned before.

As a result of studies, the present inventors have found that a membrane meets the above requirement if a fraction of pores having a diameter of 0.25 $\mu$m or more is 15% or more, which fraction is calculated from a pore diameter distribution curve obtained by the wet membrane gas permeation method. In order to evaluate the pore diameter by means of the permeability for standard particles, the evaluation should be effected with respect to at least two kinds of standard particles respectively having different particle diameters. The hollow fiber to be used in the present invention preferably has a permeability for colloidal silica, which has an average particle diameter of 0.08 μm, of 70% or more, and a permeability for polymer latex which has an average particle diameter of 0.2 μm, is 10% or more. On the other hand, if the pore diameter is too large, there remains a danger of allowing blood corpuscles such as thrombocyte to pass therethrough, and a danger of causing hemolysis. Therefore, permeability for polymer latex having an average particle diameter of 0.2 μm preferably does not exceed 80%.

The kind of the above-mentioned polymer latex is not critical, and any commercially available polymer latexes may be employed, if they have a narrow particle diameter distribution. Examples of such as the polymer latex are those of polystyrene and copolymer of styrene and butadiene.

As mentioned above, the end pore is preferably not so large as to prevent both the pass through of blood corpuscles and the hemolysis, while the larger diameter of the limiting pore is preferred for the permeability for plasma. Therefore, the ratio of the limiting pore diameter ($D_L$) as measured in accordance with the standard particle permeation method to the average nominal minor axis ($d_s$) is preferably to be equal to or larger than 0.9.

In order to attain a practical separation speed for plasma, the porous hollow fiber to be used in the present invention preferably has a water permeability of 5 to 20 l/m².hr.mmHg.

According to another aspect of the present invention, there is provided a process for preparing a plasma separator, which comprises the steps of:
(1) spinning a polyolefin to obtain a preliminary hollow fiber and subjecting the preliminary hollow fiber to cold stretching and, then, hot stretching to obtain a precursor porous hollow fiber oriented in the lengthwise direction of the porous hollow fiber and having elliptic pores defined by microfibrils that are oriented in the lengthwise direction of the hollow fiber and knotted portions that are cross-connected to said microfibrils and are each in the form of stacked lamellae, said pores including intermediate pores which are present within the wall of the hollow fiber in communicating relationship and end pores which open at the inner and outer wall surfaces of the hollow fiber and forming through-paths running from the inner wall surface of the hollow fiber to the outer wall surface of the hollow fiber;
(2) preparing a preliminary separator using a bundle of the precursor hollow fibers of predetermined lengths, said preliminary separator comprising:
 a vessel provided with a blood introduction means, a blood withdrawal means and a plasma withdrawal means; and
 a plurality of porous hollow fibers which are contained within the vessel, leaving spaces between the inner surface of said vessel and said plurality of porous hollow fibers and between and inside said plurality of porous hollow fibers ;
 said blood introduction means and said blood withdrawal means communicating with each other through said plurality of porous hollow fibers fluidtightly connected therebetween;
(3) exposing the preliminary separator to a sterilizing gas thereby to effect sterilization thereof;
(4) evacuating the preliminary separator;
(5) filling said spaces with a sterile water or sterile solution substantially not containing any non-physiological organic compound, and applying a pressure to the sterile water or sterile solution thereby to introduce the sterile water or sterile solution into said pores; and
(6) aseptically isolating from the environment the resulting sterilized separator in which said spaces and said pores are filled with the sterile water or sterile solution.

In the present process, a polyolefin such as polyethylene is spun to obtain a preliminary hollow fiber and the preliminary hollow fiber is subjected to cold stretching and, then, hot stretching. The cold stretching is effected at a stretching ratio of 5 to 100% at a temperature below 40° C., preferably at room temperature and, then, the hot stretching is effected at a temperature above 40° C., but below their melting point, preferably at a temperature ranging from 80° to 125° C., and at a stretching ratio of 100 to 900% to obtain a precursor porous hollow fiber. In this connection, reference may be made to U.S. Pat. No. 4,401,567. The thus obtained precursor porous hollow fiber has elliptic pores defined by microfibrils and knotted portions. The end pores on the inner wall surface of the precursor porous hollow fiber may preferably have an average nominal major axis ($d_{lA}$) of from 0.3 to 3.0 μm and an average nominal minor axis ($d_{sA}$) of from 0.1 to 0.5 μm. The precursor porous hollow fiber preferably has a fraction of pores having a diameter of 0.25 μm or more, relative to the whole pores, of 10% or less, as measured from a pore diameter distribution curve obtained in accordance with the wet membrane gas permeation method; a water permeability ($F_A$) of from 2 to 8 l/hr.m².mmHg; a permeability for colloidal silica, which has an average particle diameter of 0.08 μm, of 50% or less, and a permeability for polymer latex, which has an average particle diameter of 0.2 μm, of 5% or less; and a limiting pore diameter ($D_{LA}$), as measured in accordance with the standard particle permeation method, satisfying an inequality:

$$D_{LA}/d_{sA} < 0.9$$

wherein $d_{sA}$ is as defined above. Methods of the measurements as mentioned just above will be explained hereinafter.

The method of providing a preliminary separator using the precursor hollow fibers is not critical. For example, the obtained precursor hollow fiber may be cut into predetermined lengths, incorporated into a vessel provided with a plasma withdrawal means, for example a plasma outlet, and connected to the vessel by means of, for example, an adhesive such as urethane adhesive and the like. Then, a blood introduction means, for example a blood inlet, and a blood withdrawal means, for example a blood outlet, are attached to the vessel to obtain a preliminary separator.

In the present process, the prepared preliminary separator is first sterilized with a gas. The sterilization is effected in dryness, and such a sterilization is preferred because of the facile operation in comparison with that in a state filled with water. As the gas for the dry sterilization, there may preferably be used ethylene oxide (EO), which has no adverse influence on almost all the materials for medical instruments. Moreover, sterilization with ethylene oxide causes no trouble of toxicity of decomposed products as opposed to the case where sterilization is effected with steam heating under a high pressure or γ-ray irradiation. Therefore, ethylene oxide is employed without any limitation of materials for the plasma separator.

The thus sterilized preliminary separator is evacuated and, then the spaces in the vessel are filled with a sterile water or sterile solution substantially not containing any non-physiological organic compound.

As the method for evacuating the preliminary separator and filling the spaces with a sterile water or sterile solution, there may be mentioned, for example, a method which comprises respectively sealing the blood inlet, the blood outlet and the plasma outlet with, for example, a silicone rubber stopper, stabbing a needle through each of the stopper for the blood outlet or blood inlet and the stopper for the plasma outlet, evacuating the preliminary separator using a vacuum pump through the needles and filling the spaces with a sterile water or sterile solution through the needles; or a method which comprises connecting each inlet and outlet, through a connecting tube, with a sterile water filling machine provided with a vacuum pump, evacuating the preliminary separator and filling with a sterile water or sterile solution, followed by sealing the each inlet and outlet with, for example, silicon rubber stoppers. As the needle, there may be employed any hollow needles which can be stabbed through a rubber stopper or the like and is capable of passing a liquid such as water therethrough.

After filling a sterile water or sterile solution, a pressure is applied to the sterile water or sterile solution to convert the precursor hollow fiber to an ultimate follow fiber.

As the method of applying a pressure to the sterile water or sterile solution, there may be mentioned a method in which a pressure is applied by means of a sterile water filling machine connected with at least one inlet or outlet of the preliminary separator through a connecting tube or a needle; or a method in which through at least one stopper for the inlet and outlets are stabbed a needle connected to a flexible bag filled with a sterile water or sterile solution and the preliminary separator with the bag connected thereto through the needle are put in a pressure vessel, followed by application of a pressure through a medium of, for example, air. In this case, a pressure is transmitted from the bag through the needle to the sterile water or solution in the preliminary separator, thereby to convert the precusor hollow fiber into an ultimate hollow fiber. The flexible bag provided with a needle is one made of a flexible material such as non-rigid polyvinyl chloride and has a volume enough to contain a sterile water or sterile solution in a volume amount more than the total pore volume of the precursor hollow fiber in the preliminary separator.

In the process of the present invention, a pressure is applied to such an extent that the sterile water or sterile solution is introduced into the pores. By the introduction of the water or solution, the limiting pore diameter is expanded to convert the precursor hollow fiber to an ultimate hollow fiber. Preferably, the pressure is 5 kg/cm$^2$ or more. The period of time for applying a pressure is not critical and a moment is possible, however, preferably 1 minutes or more. The thus obtained porous hollow fiber may preferably have the following characteristics. The end pores which open at the inner wall surface of the hollow fiber have an average nominal major axis ($d_{IB}$) of from 0.3 to 3.0 μm, and an average nominal minor axis ($d_{sB}$) of from 0.1 to 0.5 μm. The resulting hollow fiber has a fraction of pores having a diameter of 0.25 μm or more, relative to the whole pores, of 15% or more, as measured from a pore diameter distribution curve obtained in accordance with the wet membrane gas permeation method; a water permeability ($F_B$) of from 5 to 20 l/hr.m$^2$.mmHg, $F_B$ and $F_A$ satisfying an inequality, $$F_B/F_A \geq 1.4;$$

a permeability for colloidal silica, which has an average particle diameter of 0.08 μm, of 70% or more, and a permeability for polymer latex, which has an average particle diameter of 0.2 μm, of 10% to 80%; and a limiting pore diameter ($D_{LB}$), as measured in accordance with the standard particle permeation method, satisfying an inequality:

$$D_{LB}/d_{sB} \geq 0.9$$

wherein $d_{sB}$ is as defined above.

The mechanism of the expansion of the limiting pore diameter can be explained as follows. The porous precursor hollow fiber prepared by spinning and stretching, for example, a high density polyethylene has elliptic pores defined by a number of microfibrils that are oriented in the lengthwise direction of the hollow fiber and knotted portions. In the case where a sterile water is intended to be introduced into the pores of such a precursor hollow fiber, which is not easily wetted by water, a pressure (P) necessary for introducing a sterile water into the pores may be calculated according to the following theoretical equation (1):

$$P = -\frac{4\gamma \cos \theta}{D} \qquad (1)$$

wherein γ represents surface tension of a liquid, θ represents contact angle of a liquid with a wall of the pore, and D represents pore diameter.

On the other hand, as is apparent from the above equation (1), when a certain pressure is applied to a sterile water to be introduced into the pores of the precursor hollow fiber, the water is introduced preferentially into pores having larger pore diameters. As a result, there occurs a difference in pressure between a pore having the water and a pore having no water, both pores being adjacent to a microfibril, thereby to cause mobil microfibrils to spread out and the pore diameter to be expanded, leading to increase in volume of pores having larger pore diameters. Such an increase in the volume is shown by a pore diameter distribution curve. If the introduction of a sterile water is effected into pores full of air, expansion of pore diameters is insufficient, because pores having no water are full of air and therefore a sufficient pressure difference does not occur between both sides of a microfibril.

After applying a pressure to the sterile water or sterile solution to convert the precursor hollow fiber into an ultimate hollow fiber, the separator is aseptically isolated from the environment. The aseptical isolation may be effected, for example, by a method in which, if a connecting tube made of a plastic was used for the preceding pressure application, the connecting tube is heat sealed; or a preferred method in which, if the preceding pressure application was effected through needles stabbing rubber stoppers or the like, the needles are just pulled out from the stoppers. The latter method is preferred from the viewpoint of ensuring the aseptical isolation.

The present invention will be illustrated in more detail with reference to the following Examples, which should not be construed to be limiting the scope of the present invention.

In the present specification, the properties of porous hollow fibers were determined by the following methods.

(1) Pore diameter distribution (wet membrane gas permeation method):

Based on ASTM F316-70, amounts of nitrogen gas passed through porous hollow fibers which had been wetted with ethyl alcohol were plotted versus applied pressures. Using a straight line obtained from a plot of amount of the gas passed through dry hollow fibers versus applied pressure, fraction ($\Delta Q$) of pores having a pore size in a range of $R_1$ to $R_2$ is calculated according to the following equation (2):

$$\Delta Q = \left( \frac{(\text{wet flow})_{R_1}}{(\text{dry flow})_{R_1}} - \frac{(\text{wet flow})_{R_2}}{(\text{dry flow})_{R_2}} \right) \times 100$$

Using the relation of the equation (2), there was obtained a pored diameter distribution curve by plotting the logarithms of pore diameter R as abscissa and the product of the amount (Qs) (l/kg.min, standard conditions) of gas passed through dry hollow fiber and the pore distribution $\Delta Q/\Delta \log R$ as ordinate. An integral distribution curve was also shown.

(2) Permeability for standard particles:

The following colloidal solution and latexes were employed to prepare standard particle-containing dispersions.

| Trade name | Average particle diameter | Note |
|---|---|---|
| Cataloid SI 80P | 0.08 μm | Colloidal silica manufactured and sold by Shokubai Kasei Kogyo Co., Ltd., Japan |
| Uniform Latex | 0.11 μm | Polystyrene latex manufactured and sold by Dow Chemical Co., Ltd. USA |
| Uniform Latex | 0.33 μm | |
| SBR636 | 0.20 μm | Styren-butadiene latex manufactured and sold by Dow Chemical Co., Ltd., USA |

The concentration of standard particle-containing dispersions were adjusted by diluting with water to 1% with respect to the colloidal silica having an average particle diameter of 0.08 μm, 0.033% with respect to the latexes having average particle diameters of 0.11 μm and 0.20 μm, and 0.022% with respect to the latex having an average particle diameter of 0.33 μm, based on the total weight of the respective dispersions.

Permeability for each of the standard particle was examined by filtering each of the prepared dispersions through a hollow fiber at a differential pressure of 50 mmHg or lower. Then, the thus obtained filtrates were subjected to nephelometry at a wave length of 500 nm to determine the concentration of each of the standard particles. From the determined concentration, there was calculated a permeability (Sc) for standard particles according to the equation:

$$Sc(\%) = Cf/Co \times 100$$

wherein Cf stands for the concentration of the standard particles in a filtrate and Co the concentration of those in a dispersion before filtration.

(3) Limiting pore diameter:

From the values of the permeability obtained by the method in (2) above, the limiting pore diameter is calculated according to the following Ferry's formula:

$$Sc = \left[ 2\left(1 - \frac{A}{D_L}\right)^2 - \left(1 - \frac{A}{D_L}\right)^4 \right] \times 100$$

wherein Sc represents the permeability, A represents the average particle diameter of standard particles and $D_L$ represents the limiting pore diameter.

The calculation is effected with respect to the above-mentioned four kinds of dispersions containing standard particles respectively having average particle diameters of 0.08, 0.11, 0.20 and 0.33 μm, except that in the case where Sc is out of the range of from 1 to 90%, the calculation was omitted because such a value of Sc leads to a large error. Therefore, only in the cases where Sc is in the range of from 1 to 90%, the calculation was effected and the mean value thereof was calculated to give the limiting pore diameter.

(4) Water permeability (l/hr.m².mmHg):

Measurement was carried out using pure water at 25° C. and at a differential pressure of 50 mmHg.

(5) End pore size:

An approximate 10,000-magnification photograph of the inner wall of the porous hollow fiber was taken by means of a scanning electron microscope. On the obtained photographs, 100 end pore images were arbitrarily selected and the nominal major axis and nominal minor axis of each end pore were measured with a scale. Then, mean values are calculated to give an average nominal major axis and an average nominal minor axis.

(6) Average pore diameter measured with mercury porosimeter:

Measurement was carried out with a mercury porosimeter. The logarithms of pore diameter was plotted as abscissa and the pore volume was plotted as ordinate to give a pore diameter distribution curve. The pore diameter, in the pore diameter distribution curve, at which the total pore volume was halved was referred to as "average pore diameter".

(7) Plasma separation rate and permeability for plasma components:

An ACD solution (citric acid-sodium citrate-dextrose solution)-added bovine blood and an ACD solution-added human blood were respectively passed through a plasma separator at 37° C. and at a differential pressure of 30 mmHg, while measuring the volume of the separated plasma to obtain the plasma separation rate. From the quantitative analysis of components in the blood before use and in the obtained plasma, permeabilities (Sc) for individual plasma components are obtained.

In the case where an obtaianed value of the permeability for a plasma component exceeded 100 due to the experimental error, the obtained value was shown as 100.

(8) Blue dextran permeability

Blue dextran (number average molecular weight: 2,000,000) manufactured and sold by Pharmacia Fine Chemicals AB, Sweden was dissolved in a physiological saline at a concentration of 1% by weight and the resulting saline was passed through a plasma separator at a differential pressure of 30 mmHg. From the quantitative analysis of the permeated saline, the blue dextran permeability (Sc) was obtained.

EXAMPLE 1

A high-density polyethylene (HI-ZEX 2208J, a product of Mitsui Petrochemical Co., Japan) having a density of 0.968 g/cm$^3$ and a melt index, as measured in accordance with ASTM D1238, of 5.5 was extruded from an annular hollow fiber spinning nozzle having an annular orifice outside diameter of 33 mm and an annular orifice inside diameter of 27 mm (slit width: 3 mm) at a spinning temperature of 150° C. and a spinning rate of 400 m/min. The thus obtained preliminary hollow fibers were subjected to annealing at 110° C. for 1 hour. The annealed hollow fibers were then cold stretched at a stretching ratio of 30% at room temperature, and hot stretched in two steps first at a stretching ratio of 200% at 95° C. and then at 150% at 110° C. The thus stretched hollow fibers were heat set at 110° C. to obtain precursor hollow fibers. Properties of the obtained precursor hollow fibers are shown in Table 1.

Using the thus obtained precursor hollow fibers, a plasma separator was prepared. The procedure will be described below while referring to FIG. 3.

Figure 1:
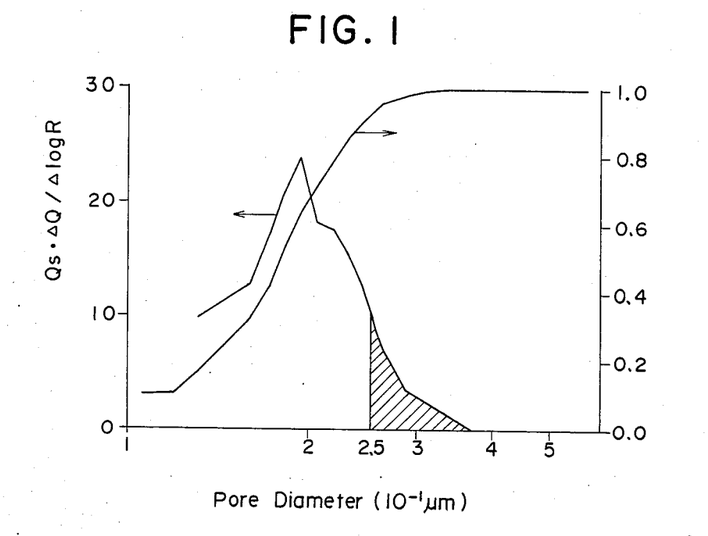
FIG. 1 is a graph showing the pore diameter distribution for a precursor hollow fiber (left ordinate: gas permeability multiplied by pore distribution, right ordinate: integral pore distribution), which will be explained later with respect to Example 1.
Figure 2:
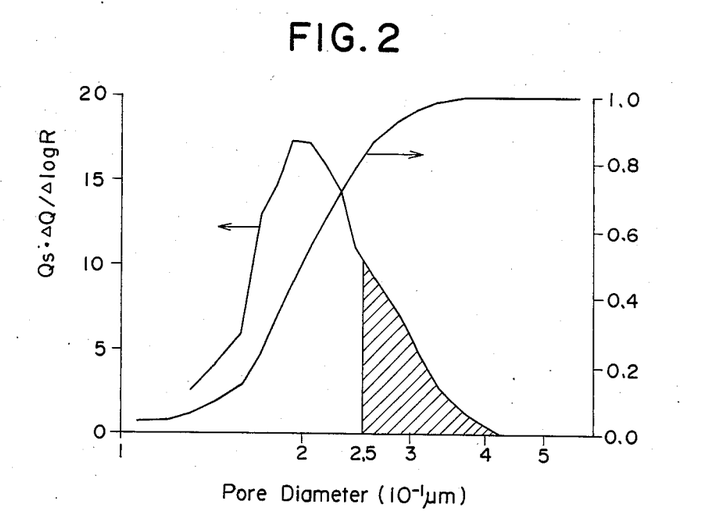
FIG. 2 is a graph showing the pore diameter distributions for the hollow fiber to be employed in the present invention (left ordinate: gas permeability multiplied by pore distribution, right ordinate: integral pore distribution), which will be explained later with respect to Example 1.
Figure 3:
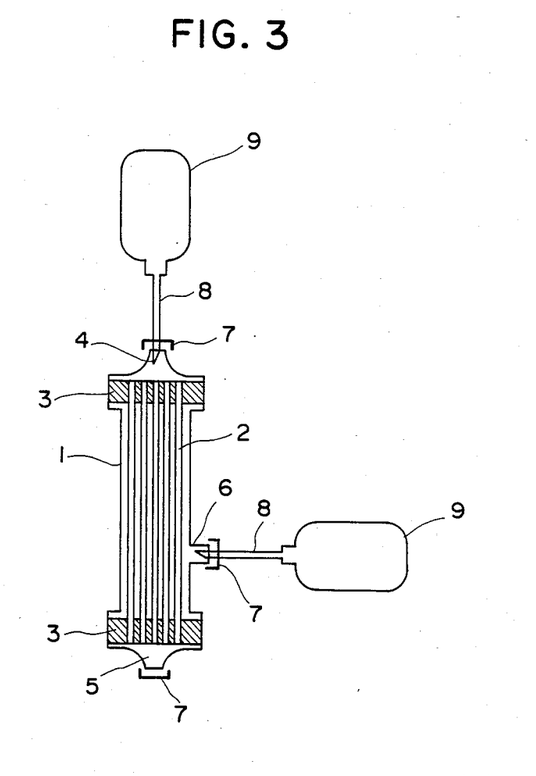
FIG. 3 is a cross-sectional view showing one form of the plasma separator according to the present invention, which will be explained later with respect to Example 1.
Figure 4:
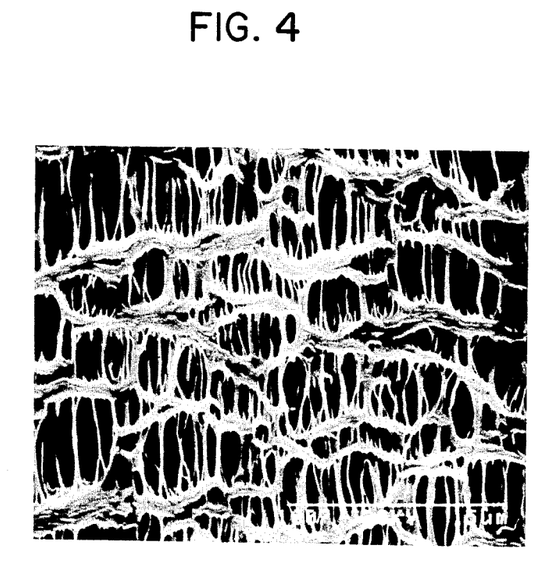
FIG. 4 is a scanning electron microphotograph (×10,000 magnification) showing an enlarged view of a portion of the inner surface of the hollow fiber to be employed in the present invention.
Figure 5:
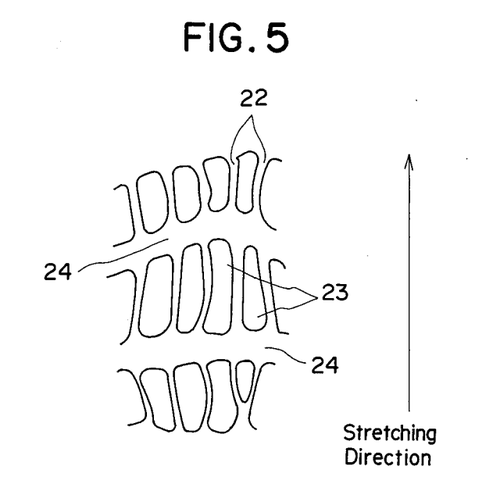
FIG. 5 is a schematic diagram of a portion of the inner surface of the hollow fiber to be employed in the present invention in which microfibrils (numeral 22), knotted portions (numeral 24) and pores (numeral 23) are illustrated.

The end portions of the 1500 precursor hollow fibers each having a length of about 15 cm were incorporated in a cylindrical vessel 1 having a plasma outlet 6, and the end portions of the fibers were fixed to the sidewall structure of the vessel at portions 3, respectively, by means of an urethane adhesive. Then a blood inlet 4 and a blood outlet 5 were attached to the vessel, thereby to prepare a preliminary separator. The thus prepared preliminary separator had an effective membrane area of 50 cm$^2$. Then, the separator was sterilized with ethylene oxide, and then the blood inlet 4, blood outlet 5 and plasma outlet 6 were respectively sealed with silicone rubber stoppers 7. Through each of the silicone rubber stoppers respectively sealing the blood inlet 4 and the plasma outlet 6 were stabbed a 18-gauge syringe needle which had been connected to a sterile water-filling machine. Through the thus stabbed syringe needles, evacuation of the separator was effected by the use of a vacuum pump which had been connected with the sterile water-filling machine. After the removal of the air, the pores of the hollow fiber and the space in the vessel were filled with a phyrogen-free sterile water by means of the sterile water-filling machine. Subsequently, the syringe needles were pulled out from the stoppers, and through each of the stoppers were alternatively stabbed a 18-gauge syringe needle 8 connected to a bag 9 made of a non-rigid polyvinyl chloride and filled with 100 ml of a sterile water. Then the separator and the bags connected thereto through the syringe needles were placed in a pressure vessel and the pressure in the pressure vessel was elevated to 10 kg/cm$^2$ with pressurized nitrogen. After application of the pressure for 10 minutes, the bags and the syringe needles were detached therefrom to complete the conversion of the precursor hollow fibers to ultimate hollow fibers thereby to prepare a plasma separator which was filled with a sterile water not containing non-physiological organic compound and aseptically isolated from the environment. Properties of the thus obtained porous hollow fibers in the plasma separator are shown in Table 1 together with those of the precursor hollow fibers. In FIGS. 1 and 2 were shown pore diameter distribution curves of the precursor hollow fiber and the ultimate hollow fiber, respectively, as measured in accordance with the wet membrane gas permeation method.

From the results shown in Table 1, it is found that the average pore diameter measured with a mercury porosimeter is a meaningless value being apart from

TABLE 1

| | Hollow fiber | | | End pores of inner wall surface | | Fraction of* pores having a diameter of 0.25 μm or more (%) | Permeability for standard particles [Sc] (Limiting pore diameter [$D_L$]) | | | | |
|---|---|---|---|---|---|---|---|---|---|---|---|
| | Inside diameter (μm) | Membrane thickness (μm) | Porosity (%) | average nominal major axis [$d_j$] (μm) | average nominal minor axis [$d_s$] (μm) | | 0.08 μm particle | 0.11 μm particle | 0.20 μm particle | 0.33 μm particle | Average of $D_L$ |
| Precursor hollow fiber | 340 | 45 | 72 | 0.9 | 0.20 | 4 | 18% (0.12 μm) | 3.3% (0.12 μm) | 0% (—)** | 0% (—)** | 0.12 μm |
| Ultimate hollow fiber | 340 | 45 | 72 | 0.9 | 0.21 | 18 | 98% (—)** | 61% (0.29 μm) | 24% (0.31 μm) | 0% (—)** | 0.30 μm |

| | Pore ratio [$D_L/d_s$] | Water permeability (l/hr · m$^2$ · mmHg) | Blue dextran permeability (%) | Average apparent pore diameter measured with mercury porosimeter (μm) |
|---|---|---|---|---|
| Precursor hollow fiber | 0.6 | 5.6 | 17 | 0.78 |
| Ultimate hollow fiber | 1.4 | 9.1 | 91 | 0.76 |

(Note)
*Measured according to the wet membrane gas permeation method
**Any value cannot be obtained because the permeability is outside an appropriate range.

the actual permeability. It is also found from the results that the porous hollow fibers according to the present invention have a high permeability for substances as compared with the precursor hollow fibers.

EXAMPLE 2

A preliminary plasma separator was prepared in substantially the same manner as in Example 1. The thus prepared preliminary separator had an effective fiber length of 13 cm and an effective membrane area of 0.21 m$^2$.

From the thus prepared preliminary separator, a plasma separator was prepared in substantially the same manner as in Example 1 except that the pressure was applied to the vessel and the bag for 30 minutes.

Plasma-separating abilities of the thus prepared plasma separator and the preliminary separator were examined using a bovine blood. Examination was also carried out using a healthy human blood with respect to the plasma separator. During the examination, the blood was fed at flow rates of 60 ml/min for bovine blood and 50 ml/min for human blood until there was collected 400 ml of plasma in each examination.

As a result, the preliminary separator exhibited insufficient performance with respect to plasma permeability and plasma permeation rate. The plasma separator of the present invention, however, exhibited a sufficient plasma permeability and plasma permeation rate, and caused no increase in the amount of isolated hemoglobin due to hemolysis.

The present plasma separator was also evaluated with respect to test items of eluted matters, biological investigation and sterility in accordance with the standard of Japanese government's Ministry of Health and Welfare on artificial kidney for blood dialysis. As a result, the plasma separator passed all the test items and was found to have a high degree of safety.

The plasma separator of the present invention was further subjected to extracorporeal blood circulation test of a mixed-breed adult dog. In this test, ACD solution (citric acid-sodium citrate-dextrose solution) was employed as an anticoagulant, and the blood was extracorporeally circulated at a rate of 60 ml/min for 20 minutes while collecting a plasma at a rate of 20 ml/min with a measuring pump. After completion of the circulation test, the inner wall surface of the hollow fibers of the plasma separator was washed with a physiological saline, fixed with glutaraldehyde, and subjected to observation by mean of a scanning electron microscope. There were observed no hemolysis and little change in number of blood corpuscle components of the dog. Moreover, from the results of the electron microscopy, there were observed little adhesion of blood corpuscles on the inner wall surface of the hollow fibers and no formation of fibrin, thereby to confirm that there was no adverse influence on blood. Results are shown in Table 2 with respect to bovine blood and in Table 3 with respect to healthy human blood.

COMPARATIVE EXAMPLE

A preliminary plasma separator was prepared in substantially the same manner as in Example 1. The thus prepared preliminary plasma separator was sterilized with ethylene oxide gas and then filled with a 50% ethanol solution in water to wet the hollow fibers in the preliminary plasma separator. Then the 50% ethanol solution was discharged from the plasma separator and the separator was washed with 10 l of a sterile water. The washing was carried out by feeding the sterile water through the blood inlet at a rate of 100 ml/min while discharging the sterile water cyclically first through the blood outlet for 10 minutes and second through the plasma outlet for 10 minutes to prepare a plasma separator. After the washing, the water within the thus prepared plasma separator was discharged, and any remaining ethanol was extracted with acetone for 8 hours. As a result of the determination of the extracted ethanol according to gas chromatography, there was detected 950 ppm ethanol relative to the weight of the polyethylene hollow fiber in the separator.

On the other hand, in substantially the same manner as in Example 2, an extracorporeal blood circulation test of a dog was effected using the above-prepared plasma separator and the inner wall surface of the hollow fiber after the circulation was observed by means of scanning electron microscope. As a result of the observation, it was found that a large number of blood corpuscles were adhering to the surface and aggregates of deformed thrombocytes formed a large number of thrombuses.

What is claimed is:

1. A plasma separator comprising:
   a vessel provided with a blood introduction means, a blood withdrawal means and a plasma withdrawal means; and
   a plurality of porous hollow fibers which are contained within the vessel, leaving spaces between the inner surface of said vessel and said plurality of porous hollow fibers and between and inside said plurality of porous hollow fibers;
   said blood introduction means and said blood withdrawal means communicating with each other through said plurality of porous hollow fibers fluid tightly connected therebetween;
   said hollow fibers being adapted to pass blood therethrough while causing the plasma component of the blood to be selectively passed through the walls of the hollow fibers and withdrawn through the plasma withdrawal means;

TABLE 2

| | Plasma separation rate (ml/min) | Permeability of plasma components (%) | | | | |
|---|---|---|---|---|---|---|
| | | Alb*[1] | IgG*[2] | IgM*[3] | Fib*[4] | Total protein |
| Preliminary separator | 13 | 95 | 76 | 52 | 45 | 86 |
| Plasma separator | 19.5 | 100 | 99 | 100 | 100 | 100 |

*[1]Alb: albumin
*[2]IgG: immunoglobulin G
*[3]IgM: immunoglobulin M
*[4]Fib: fibrinogen

TABLE 3

| | Plasma separation rate (ml/min) | Permeability of plasma components (%) | | | | | | Free hemoglobin (mg/dl) |
|---|---|---|---|---|---|---|---|---|
| | | Alb*[1] | IgG*[2] | IgM*[3] | Fib*[4] | FVIII*[5] | Plasminogen | |
| Plasma separator | 16.3 | 99 | 98 | 100 | 100 | 100 | 100 | not more than 1 |

*[1]Alb: albumin
*[2]IgG: immunoglobulin G
*[3]IgM: immunoglobulin M
*[4]Fib: fibrinogen
*[5]FVIII: blood-coagulant factor VIII each hollow fiber being made of a polyolefin oriented in the lengthwise direction of the hollow fiber and having elliptic pores defined by microfibrils that are oriented in the lengthwise direction of the hollow fiber and knotted portions that are cross-connected to said microfibrils and are each in the form of stacked lamellae, said pores including intermediate pores which are present within the wall of the porous hollow fiber in communicating relationship and end pores which open at the inner and outer wall surfaces of the hollow fiber and forming throughpaths running from the inner wall surface of the porous hollow fiber to the outer wall surface of the porous hollow fiber;

each end pore which opens at the inner wall surface of the hollow fiber having:

an average nominal major axis (dl) of from 0.3 to 3.0 μm, and an average nominal minor axis ($d_s$) of from 0.1 to 0.5 μm;

each hollow fiber having:

a fraction of pores having a diameter of 0.25 μm or more, relative to the whole pores, of 15% or more, as measured from a pore diameter distribution curve obtained in accordance with the wet membrane gas permeation method, a water permeability of from 5 to 20 l/hr.m².mmHg, a permeability for colloidal silica, which has an average particle diameter of 0.08 μm, of 70% or more, and a permeability for polymer latex, which has an average particle diameter of 0.2 μm, of from 10% to 80%, and a limiting pore diameter ($D_L$), as measured in accordance with the standard particle permeation method, satisfying an inequality:

$$D_L/d_s \geqq 0.9$$

wherein $d_s$ is as defined above;

said spaces and said pores being filled with a sterile water or sterile solution substantially not containing any non-physiological organic compound;

and which separator has been sterilized with a sterilizing gas before said spaces and said pores are filled with the sterile water or sterile solution and is aseptically isolated from the environment after said spaces and said pores are filled with the sterile water or sterile solution.

2. A separator according to claim 1, wherein said polyolefin is a high density polyethylene.

3. A separator according to claim 1, wherein said sterilizing gas is ethylene oxide.

4. A separator according to claim 1, wherein the blood introduction means, the blood withdrawal means and the plasma withdrawal means are closed with stoppers to effect said aseptic isolation.

5. A process for preparing a plasma separator, which comprises the steps of:

(1) spinning a polyolefin to obtain a preliminary hollow fiber and subjecting the preliminary hollow fiber to cold stretching and, then, hot stretching to obtain a precursor porous hollow fiber oriented in the lengthwise direction of the porous hollow fiber and having elliptic pores defined by microfibrils that are oriented in the lengthwise direction of the hollow fiber and knotted portions that are cross-connected to said microfibrils and are each in the form of stacked lamellae, said pores including intermediate pores which are present within the wall of the hollow fiber in communicating relationship and end pores which open at the inner and outer wall surfaces of the hollow fiber and forming throughpaths running from the inner wall surface of the hollow fiber to the outer wall surface of the hollow fiber;

(2) preparing a preliminary separator using a bundle of the precursor hollow fibers of predetermined lengths, said preliminary separator comprising:

a vessel provided with a blood introduction means, a blood withdrawal means and a plasma withdrawal means; and a plurality of porous hollow fibers which are contained within the vessel, leaving spaces between the inner surface of said vessel and said plurality of porous hollow fibers and between and inside said plurality of porous hollow fibers;

said blood introduction means and said blood withdrawal means communicating with each other through said plurality of porous hollow fibers fluidtightly connected therebetween;

(3) exposing the preliminary separator to a sterilizing gas thereby to effect sterilization thereof;

(4) evacuating the preliminary separator;

(5) filling said spaces with a sterile water or sterile solution substantially not containing any non-physiological organic compound, and applying a pressure to the sterile water or sterile solution thereby to introduce the sterile water or sterile solution into said pores; and (6) aseptically isolating from the environment the resulting sterilized separator in which said spaces and said pores are filled with the sterile water or sterile solution.

6. A process according to claim 5, wherein:

in step (1) said cold stretching and hot stretching are effected under such conditions that said precursor hollow fiber has the following characteristics:

(a) each end pore which opens at the inner wall surface of the hollow fiber having:

an average nominal major axis ($d_{lA}$) of from 0.3 to 3.0 μm, and an average nominal minor axis ($d_{sA}$) of from 0.1 to 0.5 μm; and (b) said precursor hollow fiber having:

a fraction of pores having a diameter of 0.25 μm or more, relative to the whole pores, of 10% or less, as measured from a pore diameter distribution curve obtained in accordance with the wet membrane gas permeation method, a water permeability ($F_A$) of from 2 to 8 l/hr.m².mmHg, a permeability for colloidal silica, which has an average particle diameter of 0.08 μm, of 50% or less, and a permeability for polymer latex, which has an average particle diameter of 0.2 μm, of 5% or less, and a limiting pore diameter ($D_{LA}$), as measured in accordance with the standard particle permeation method, satisfying an inequality:

$$D_{LA}/d_{sA} < 0.9$$

wherein $d_{sA}$ is as defined above;

and in step (5) the pressure is applied to a level sufficient to expand said limiting pore diameter while keeping said end pores substantially unaltered so that the resulting porous hollow fiber has the following characteristics:
(a') each end pore which opens at the inner wall surface of the hollow fiber having:
an average nominal major axis ($d_{IB}$) of from 0.3 to 3.0 μm, and
an average nominal minor axis ($d_{sB}$) of from 0.1 to 0.5 μm, the values of $d_{IB}$ and $d_{sB}$ being substantially the same as the values of $d_{IA}$ and $d_{sA}$, respectively; and
(b') the resulting hollow fiber having;
a fraction of pores having a diameter of 0.25 μm or more, relative to the whole pores, of 15% or more, as measured from a pore diameter distribution curve obtained in accordance with the wet membrane gas permeation method,
a water permeability ($F_B$) of from 5 to 20 l/hr.m².mmHg, $F_B$ and $F_A$ satisfying an inequality:

$$F_B/F_A \geq 1.4,$$

a permeability for colloidal silica, which has an average particle diameter of 0.08 μm, of 70% or more, and a permeability for polymer latex, which has an average particle diameter of 0.2 μm, of 10% to 80%, and
a limiting pore diameter ($D_{LB}$), as measured in accordance with the standard particle permeation method, satisfying an inequality:

$$D_{LB}/d_{sB} \geq 0.9$$

wherein $d_{sB}$ is as defined above.

7. A process according to claim 5, wherein said polyolefin is a high density polyethylene.

8. A process according to claim 5, wherein said sterilizing gas is ethylene oxide.

9. A process according to claim 5, wherein:
in step (4) before said evacuation, needle-stabbable stoppers are applied to the blood introduction means, blood withdrawal means and plasma withdrawal means and needles are stabbed through the plasma withdrawal means and the blood introduction means or blood withdrawal means; and
in steps (4) to (5), said evacuation, said filling with the sterile water or sterile solution and said application of a pressure are performed through the needles.

* * * * *